United States Patent
Dischö et al.

(10) Patent No.: US 6,489,032 B1
(45) Date of Patent: Dec. 3, 2002

(54) CEMENT STRUCTURE CONTAINING A WATERPROOFING LAYER

(75) Inventors: Karoly Dischö, Effretikon (CH); Max Oppliger, Allschwil (CH)

(73) Assignee: MBT Schweiz AG, Zurich (CH)

( * ) Notice: Subject to any disclaimer, the term of this patent is extended or adjusted under 35 U.S.C. 154(b) by 0 days.

(21) Appl. No.: 09/117,418

(22) PCT Filed: Dec. 1, 1997

(86) PCT No.: PCT/EP97/06732

§ 371 (c)(1),
(2), (4) Date: Jan. 5, 1999

(87) PCT Pub. No.: WO98/24738

PCT Pub. Date: Jun. 11, 1998

(Under 37 CFR 1.47)

(30) Foreign Application Priority Data

Dec. 4, 1996 (GB) .............................. 9625163

(51) Int. Cl.⁷ .............................. B32B 13/04
(52) U.S. Cl. ....................... 428/454; 427/421
(58) Field of Search ................. 428/454; 427/136, 427/421

(56) References Cited

U.S. PATENT DOCUMENTS 4,115,501 A * 9/1978 Yano .......................... 264/133
4,410,595 A * 10/1983 Matsumoto et al. ........ 428/412

FOREIGN PATENT DOCUMENTS

EP 0460744 A1 11/1991 ........... C04B/24/26

OTHER PUBLICATIONS

Patent Abstract of Japan, vol. 018, No. 464 (M–1665), Aug. 30, 1994 & JP 06 146798 A, May 27, 1994.
Patent Abstract of Japan, vol. 018, No. 291 (C–1208, Jun. 3, 1994 & JP 06 057060 A, Mar. 1, 1994.
PCT International Search Report for PCT/EP97/06732 dated Apr. 06, 1998.

* cited by examiner

Primary Examiner—Deborah Jones
Assistant Examiner—G. Blackwell-Rudasill
(74) Attorney, Agent, or Firm—Fish & Richardson PC

(57) ABSTRACT

A process of providing a waterproof concrete structure comprising the steps of
(a) providing a layer of a concrete composition on a support;
(b) spraying on to this concrete composition a waterproofing layer; and
(c) applying to the waterproofing layer a further layer of a concrete composition;

characterized in that the waterproofing layer is provided by a composition which comprises an aqueous dispersion of coalescable particles of thermoplastic polymer. The method is useful in the waterproofing of tunnel linings.

11 Claims, No Drawings

CEMENT STRUCTURE CONTAINING A WATERPROOFING LAYER

This invention relates to membranes for use in the waterproofing of cementitious structures.

In the provision of cementitious structures, such as the building of tunnels by boring or excavating and then shotcreting, there is often a need to provide waterproofing. This is typically achieved either by providing drainage or by firstly injecting fissures in the rock with materials such as cement, microcement and reactive resin, this being followed by a layer of shotcrete. To this layer is applied a waterproof membrane, and to this membrane is applied a further layer of shotcrete or in situ concrete. The waterproof membrane is typically a prefabricated sheet of waterproof polymeric material which is anchored in place by, for example, anchoring bolts. The result is thus a "sandwich" construction. Sometimes there may be applied by in situ placing or spraying a further layer of concrete with reinforcing (fibres or mesh), or this reinforcing may be incorporated into the final concrete coating.

The labour intensity of such a method, plus the fact that the existing membranes have not been wholly satisfactory, particularly with respect to leaking, has led to the search for alternatives. Recently, attempts have been made to spray on a suitable membrane. These have used a two-pack polyurethane material, but these have suffered from drawbacks such as complicated application, toxicity problems (from the isocyanate curing agents), bonding problems to wet shotcrete and inhibition of polyurethane formation because of high tunnel humidity has prevented the obvious potential benefits of such a method being realized.

It has now been found that it is possible to provide a suitable membrane by means of a method which avoids most or even all of the drawbacks hereinabove mentioned. There is therefore provided, according to the present invention, a process of providing a waterproof concrete structure comprising the steps of (a) providing a primary layer of a concrete composition on a support;

(b) spraying on to this concrete composition a waterproofing layer; and (c) applying to the waterproofing layer a layer of a concrete composition;

characterized in that the waterproofing layer is provided by a composition which comprises as a binder an aqueous dispersion of coalescable particles of thermoplastic polymer.

The invention further provides a waterproof sandwich concrete structure comprising two layers of concrete separated by a coherent intermediate polymeric layer whose binder is coalesced particles of thermoplastic polymer.

By "support" is meant a untreated, water-permeable surface to which the waterproof concrete structure of this invention is applied. This will usually be a rough rock surface, but it may equally well be a man-made surface, such as a ceiling. The concrete compositions of steps (a) and (c) hereinabove described may be the same or different. In the case of the concrete composition of the primary layer (a), the scope of this term is considered to encompass not only simple concrete compositions (cold sprayed or prefabricated) but also such known variants as concrete followed by a leveling or smoothing layer of a spray mortar (up to 4 mm).

By "binder" is meant a material which on drying forms a coherent, continuous film and by "thermoplastic" is meant a material which does not react to form a crosslinked structure. By "coalescable particles" is meant particles of a film-forming suspension or emulsion which, on the removal of the continuous medium in which they are dispersed, at least partially merge to form a continuous, coherent Mm The polymer dispersions which are useful in this invention are thus similar in nature to the film-forming aqueous dispersions which are used, for example, as film-forming media in aqueous "emulsion" household paints. Included in this definition of "binder" are compositions which include thermoplastic coalescable particles and cement.

The aqueous dispersion of coalescable thermoplastic polymer particles may be chosen from a wide range of materials known to the art, the nature of the polymer itself being unimportant. Thus, for example, suitable polymers include polyurethanes, polyesters, vinyls and acrylics. Particularly suitable polymers are addition polymers derived from ethylenically-unsaturated monomers by addition polymerisation. Particularly suitable materials within this group are those which have a glass transition temperature (Tg) such that they remain in the "rubbery" condition under conditions of use, those having a degree of elastomeric properties being particularly desirable. It is preferred that the Tg be below 15° C., more preferably below −15° C. The weight solids contents of such dispersions typically lie within the range of 30–60%. Specific examples of suitable materials include polyurethanes, styrene-butadiene copolymers, ABS (acrylonitrile-butadiene-styrene) polymers, acrylonitrile-butadiene copolymers, styrene-acrylic copolymers, polsulphide dispersions, polyurethane-acrylic dispersions, polyisoprene and PVC latexes and copolymers of vinyl chloride and/or vinyl acetate with acrylic monomers such as (meth) acrylic acid and esters thereof Materials such as bitumen emulsions may be used in conjunction with these materials, but as such materials do not coalesce, they should not comprise more than 50% by weight solids of the binder. This list is not exhaustive, and the skilled person equipped within the concept of this invention will readily be able to identify other suitable materials. Many such materials are available commercially and examples of suitable commercial materials include those sold by BASF AG. under the trade mark "Acronal" and those sold by Synthomer under the trade mark "Synthomer".

In addition to the aqueous dispersion, the composition may include other ingredients. One especially useful ingredient is filler. This not only "extends" the composition, but also roughens the surface, thus providing a "key" for a subsequently applied cementitious composition. Its presence is preferred. Typical examples of suitable fillers include quartz sand and quartz flour of average diameters in the range of from 0.04–1.5 mm, as well as dolomite, talc, mica, barytes, iron oxide, titanium dioxide, rubber and plastics granules, lightweighted aggregates and glassy fumace residues such as "holospheres". Fibres of steel, glass or polymeric material can also be used, preferred examples of polymeric fibre being those of thermoplastic material, especially polyethylene and polyacrylonitrile, preferably with length of from 0.2–12 mm and surface area of from 6–8M$^2$/ g.

There may also be added to the compositions of this invention standard ingredients in art-recognized quantities. Typical examples of additives whose presence may be beneficial include flow-enhancing agents, defoamers, dispersants, colouring materials, wetting agents, rheology modifiers and catalysts.

When there is no filler present, a composition for use in this invention may comprise 100% of dispersion. When desired, additives may comprise up to 5%, preferably 0.1–5% by weight (calculated on active ingredients of additive per weight of liquid dispersion). When filler is present (the preferred case), the composition preferably comprises 20–80% (more preferably 30–50%) by weight dispersion, 79.9–15% (more preferably 69.9–15%) by weight filler, and 0.1–5% by weight additive(s).

The weight of dispersion is the weight of the liquid dispersion and the weight of the additive is the weight of active ingredient.

The composition may be applied by spraying to a primary layer concrete. This is preferably shotcrete, but it may be other suitable cementitious compositions, such as polymer concrete. The membrane layer applied may vary in thickness, depending on the material used, the conditions of application and the properties (such as crack bridging ability) desired, but as a general rule it should have a thickness of 2–15mm, preferably 2–6 mm. The application may be done in a single spraying pass or in several passes. To this sprayed composition is applied a further layer of cementitious composition, preferably shotcrete applied by spraying. The result is a "sandwich" construction. The preferred ways in which such a sandwich construction may be created are shown below:

|  | Variation | | |
|---|---|---|---|
|  | A | B | C |
| 1st. layer | shotcrete (typically 50–250 mm thick) | prefabricated concrete elements (200–500 mm) | shotcrete |
| 2nd. layer | 2–10 mm thick membrane (Example 2 composition) | 2–5 mm thick membrane (Example 4 composition) | membrane (5–10 mm) |
| 3rd. layer | shotcrete (typically 50–250 mm thick) | shotcrete or concrete placed in situ | poured concrete or concrete placed in situ |

The preferred variation is the A variation. Included in the first layer is the possibility that there may be applied thereto a leveling mortar, this being from 2–15 mm thick. The membrane can be sprayed on to the concrete 1–90 days after the application of the concrete. If spraying is consistent within 3 days after concrete application, there is the additional advantage that the water in the dispersion can help with the cement hydration. When the concrete of the first layer has been in place for a longer time (3–60 days), it may be necessary to wash the surface with water. This removes only residues and prewastes the surface, giving better membrane adhesion. As previously mentioned, it can be applied in a single pass or in a number of passes with suitable pauses to allow drying and/or hardening. In the multi-layer approach, one or more of the sprayed layers may include reinforcing fibres of glass, steel, ceramic or polymer; alternatively, reinforcing in the form of mesh or roving can be applied to still-wet membrane and the reinforcing then covered by a further layer of membrane.

The structure thus formed has excellent waterproofing properties, coupled with excellent water vapour permeability, thus allowing any trapped water to escape through the membrane and avoiding any interfacial failure. In addition, it is durable, safe and easy to apply and relatively inexpensive.

The invention is further described with reference to the following non-limiting examples which all parts are expressed by weight.

A number of compositions are prepared by blending together the following combinations of ingredients:

EXAMPLE 1

| polymer dispersion[1] | 30 parts |
|---|---|
| barytes | 27 parts |
| calcium carbonate | 42.5 parts |
| titanium dioxide | 0.5 parts |

[1]styrene-acrylic ester copolymer emulsion 50% solids by weight ("Acronal" (trade mark) S361 (ex BASF))

EXAMPLE 2

| polymer dispersion[2] | 40 parts |
|---|---|
| calcium carbonate | 55 parts |
| defoamer[3] | 2 parts |
| dispersant[4] | 1 parts |
| pigment[5] | 2 parts |

[2]"Acronal" S361
[3]"BYK-035" ex Byk Chemie, a mixture of hydrophobic components in a paraffin-based mineral oil
[4]"Pigment dispersant A" ex BASF, a 20% aqueous solution of ammonium polyacrylates
[5]black iron oxide "Bayferrox" (trade mark) 316 ex Bayer

EXAMPLE 3

| polymer dispersion[6] | 50 parts |
|---|---|
| barytes | 48 parts |
| defoamer[7] | 1 parts |
| dispersant[8] | 1 parts |

[6]"Acronal" 6210 (styrene-acrylic ester copolymer)
[7]"Agitan" (trade mark) 731 ex Münzing Chemie GmbH, a modified organopolysiloxane
[8]"Pigment dispersant A".

EXAMPLE 4

| polymer dispersion[9] | 40 parts |
|---|---|
| calcium carbonate | 32 parts |
| defoamer[10] | 2 parts |
| pigment dispersant[11] | 0.5 parts |
| pigment[12] | 0.5 parts |
| barytes | 22 parts |
| acrylic fibres 0.5 mm long | 1 parts |

[9]"Acronal" S361
[10]BYK-035
[11]"Pigment dispersant A"
[12]red iron oxide "Bayferrox" 105 M

EXAMPLE 5

| polymer dispersion[13] | 60 parts |
|---|---|
| calcium carbonate | 40 parts |

[13]styrene-butadiene-acrylic ester copolymer emulsion 53% solids ("Synthomer" 33y 20 (ex Synthomer))

EXAMPLE 6

An Example of a Mixed System (Polymer Dispersion+ Cement)

| | |
|---|---|
| polymer dispersion[14] | 55 parts |
| portland cement | 14.8 parts |
| quartz sand 0.1–0.4 mm | 8 parts |
| quartz flour | 22 parts |
| polyethylene fibres, average length 0.2 mm | 0.2 parts |

[14]acrylic ester-acrylonitrile copolymer emulsion 55% solids by weight ("Acronal" DS 6137X)

EXAMPLE 7

| | |
|---|---|
| polymer dispersion[15] | 35 parts |
| polyethylene/polypropylene fibres | 1.5 parts |
| barytes | 48 parts |
| hollow glass spheres | 10 parts |
| water | 5.5 parts |

Testing of Compositions

The compositions according to Examples 2 and 3 are sprayed on to concrete plates of dimensions 500×500×40 mm at a film build of 2 mm and tested. The results are shown in Table 1.

TABLE 1

| Property measured | Result | |
|---|---|---|
| | Example 2 | Example 3 |
| bonding strength (N/mm$^2$)[1] | 0.6 | 0.6 |
| strain at rupture (%)[2] | | |
| at room temperature | 250 | 140 |
| at −20° C. | 63 | 40 |
| stress (N/mm$^2$)[3] at rupture | | |
| at room temperature | 0.8 | 1.7 |
| at −20° C. | 8.5 | 7.7 |
| tear propagation (N/mm)[4] (at room temperature) | 11 | 12 |
| water absorption (%)[5] (3 d at room temperature) | 5 | 10 |

[1]measured according to DIN/ISO 4624
[2]measured according to DIN 53504
[3]measured according to DIN 53504
[4]measured according to DIN 53515
[5]measured according to DIN 62617

The crack-bridging ability of the compositions of the invention depends on the thickness of the membrane deposited. The excellent crack-bridging ability of the compositions according to the invention is demonstrated by the testing of the composition of Example 2 on a universal testing machine. In this method, a cylindrical specimen of concrete (diameter 50 mm, thickness 30 mm) is stretched on the machine at a rate such that there is generated in the concrete a continuous transverse crack at a rate of 0.1 mm/min. The crack width in the concrete is measured at the point when there occurs in the membrane a crack extending completely through it. The results are shown in Table 2.

TABLE 2

| membrane thickness (mm) | test temperature (° C.) | crack width in concrete (mm) at through cracking point in membrane |
|---|---|---|
| 0.7 | 20 | 1.5 |
| | −20 | 1.0 |
| 1.7 | 20 | 2.7 |
| | −20 | 2.1 |
| 2.3 | 20 | 4.1 |
| | −20 | 3.6 |

What is claimed is:
1. A process of providing a waterproof concrete structure comprising the steps of
   (a) providing a primary layer of a concrete composition on a support;
   (b) spraying on to this concrete composition a waterproofing layer;
   and
   (c) applying to the waterproofing layer a farther layer of a concrete composition;
      characterized in that the waterproofing layer is provided by a composition which comprises an aqueous dispersion of coalescable particles of a thermoplastic polymer.
2. A process according to claim 1, wherein the thermoplastic polymer is an addition polymer produced by polymerisation of ethylenically-unsaturated monomers.
3. A process according to claim 1, wherein the thermoplastic polymer exhibits elastomeric properties.
4. A process according to claim 1, wherein the Tg of the thermoplastic polymer is below 15° C.
5. A process according to claim 1, wherein the Tg of the thermoplastic polymer is below −15° C.
6. A process according to claim 1, wherein the composition further comprises fillers or additives.
7. A process according to claim 6, wherein the composition consists of: 20–80% by weight of the aqueous dispersion of coalescable particles of a thermoplastic polymer dispersion, 79.9–15% by weight of a filler, and 0.1–5% by weight of an additive.
8. A waterproof sandwich concrete structure comprising two layers of concrete separated by a coherent intermediate polymeric layer whose binder is coalesced particles of thermoplastic polymer.
9. A waterproof sandwich concrete structure according to claim 8 which comprises:
   a primary layer of a cementitious composition;
   a further layer of a cementitious composition;
   and a waterproofing layer intermediate the said primary layer and the said further layer;
      characterized in that the waterproofing layer is a composition which comprises an aqueous dispersion of coalescable particles of a thermoplastic polymer.
10. A waterproof sandwich concrete structure according to claim 9 wherein the waterproofing layer is a composition which comprises an aqueous dispersion of coalescable particles of a thermoplastic polymer, and which further comprises from 0.1–5% wt. of at least one additive.
11. A waterproof sandwich concrete structure according to claim 9, wherein the waterproofing layer is a composition which comprises:
   20–80% wt. of an aqueous dispersion of coalescable particles of a thermoplastic polymer;
   15–79.9% wt. of at least one filler; and,
   0.1–5% wt. of at least one additive.

* * * * *

UNITED STATES PATENT AND TRADEMARK OFFICE
CERTIFICATE OF CORRECTION

PATENT NO.    : 6,489,032 B1
DATED         : December 3, 2002
INVENTOR(S)   : K. Dischö et al.

It is certified that error appears in the above-identified patent and that said Letters Patent is hereby corrected as shown below:

<u>Title page,</u>
Item [12], change "Dischöet" to -- Dischö --

<u>Column 6,</u>
Line 21, change "farther" to -- further --

Signed and Sealed this

Fourth Day of March, 2003

JAMES E. ROGAN
*Director of the United States Patent and Trademark Office*